US007121313B2

(12) United States Patent
Ito

(10) Patent No.: US 7,121,313 B2
(45) Date of Patent: Oct. 17, 2006

(54) LABEL PEELING MECHANISM FOR CONTINUOUS LABEL STRIP, AND LABEL PRINTER APPARATUS USING THE MECHANISM

(75) Inventor: Akihiko Ito, Chiba (JP)

(73) Assignee: Seiko Instruments Inc., (JP)

(*) Notice: Subject to any disclaimer, the term of this patent is extended or adjusted under 35 U.S.C. 154(b) by 67 days.

(21) Appl. No.: 10/659,498

(22) Filed: Sep. 10, 2003

(65) Prior Publication Data

US 2004/0079490 A1 Apr. 29, 2004

(30) Foreign Application Priority Data

Sep. 25, 2002 (JP) ............................ 2002-279012

(51) Int. Cl.
*B32B 38/10* (2006.01)

(52) U.S. Cl. ...................... 156/584; 156/247; 156/344; 156/542

(58) Field of Classification Search ................ 156/247, 156/249, 344, 541, 542, 584, DIG. 33, 387
See application file for complete search history.

(56) References Cited

U.S. PATENT DOCUMENTS

| | | | | |
|---|---|---|---|---|
| 3,169,895 | A * | 2/1965 | Sohn | 156/361 |
| 3,369,952 | A * | 2/1968 | Rieger | 156/577 |
| 4,563,235 | A * | 1/1986 | Karn | 156/577 |
| 4,880,490 | A * | 11/1989 | MacIntyre | 156/541 |
| 5,013,387 | A * | 5/1991 | Goodwin et al. | 156/384 |
| 5,570,121 | A * | 10/1996 | Mistyurik et al. | 347/171 |
| 5,716,492 | A * | 2/1998 | Li | 156/538 |
| 5,718,525 | A * | 2/1998 | Bruhnke et al. | 400/586 |
| 5,910,227 | A * | 6/1999 | Mistyurik et al. | 156/384 |
| 6,527,026 | B1 * | 3/2003 | Huggins | 156/387 |
| 6,544,378 | B1 * | 4/2003 | Brough et al. | 156/344 |
| 6,805,184 | B1 * | 10/2004 | Hsiu-Man | 156/584 |
| 2003/0071051 | A1 * | 4/2003 | Martinsen | 221/70 |

* cited by examiner

*Primary Examiner*—Mark A. Osele
(74) *Attorney, Agent, or Firm*—Adams & Wilks

(57) ABSTRACT

A label peeling mechanism has a peeling member for peeling adhesive backed labels from a backing member of a continuous label strip. A conveying unit conveys the continuous label strip to the peeling member. A discharge frame has a discharge opening for discharging the adhesive backed labels peeled by the peeling member from the backing member of the continuous label strip. A slack preventing member integral with the discharge frame suppresses slack of the continuous label strip as the adhesive backed labels are peeled by the peeling member from the backing member of the continuous label strip.

28 Claims, 5 Drawing Sheets

LABEL PEELING MECHANISM FOR CONTINUOUS LABEL STRIP, AND LABEL PRINTER APPARATUS USING THE MECHANISM

BACKGROUND OF THE INVENTION

1. Field of the Invention

The present invention relates to a label peeling mechanism for a continuous label strip and to a label printer apparatus using the label peeling mechanism. More specifically, the present invention relates to a label peeling mechanism by which a continuous label strip obtained by provisionally attaching multiple adhesive label pieces to the front surface of a sheet-shaped backing strip and winding the backing strip with the label pieces to a roll shape is conveyed, and the label pieces are peeled and separated from the backing strip at a predetermined position. In particular, the present invention relates to a technique with which it is possible to suppress slack in the conveyed continuous label strip.

2. Description of the Related Art

Conventionally, there has been used a label printer apparatus that uses a continuous label strip (hereinafter referred to as the "label sheet") obtained by provisionally attaching label pieces (hereinafter simply referred to as the "labels") to the front surface of a sheet-shaped backing strip and winding the backing strip with the labels to a roll shape, and that performs predetermined printing on each label.

As an example of a print scheme used by this apparatus, such as a thermal print scheme can be named with which a printable surface made of a thermal coloring layer is formed on the front surface of each label and printing is performed on the label by a thermal head abutted against the printable surface. After information, such as characters or a barcode, representing a trade name or a price is printed on the printable surface of the label, the label is peeled from the backing strip and is stuck on an article, such as a commodity product, through the adhesive underside thereof.

If printed labels are peeled one by one by manual work, this consumes much time and effort, and there occurs an inefficiency problem. In particular, in the case of labels for commercial use, it is required to peel many labels in a short period of time, so that if this peeling operation is manually conducted, the inefficiency problem becomes prominent.

In view of this problem, there has been devised a mechanism for automatically peeling printed labels.

Such a label peeling mechanism and a label printer apparatus provided with the mechanism are disclosed in prior art documents such as JP 11-171155 A, JP 06-40443 A, Japanese Utility Model Registration No. 3040855, Japanese Utility Model Application Laid-open No. Hei 05-86808, and Japanese Utility Model Application Laid-open No. Hei 03-75114.

FIG. 5 shows a schematic construction of a label printer provided with a conventional label peeling mechanism disclosed in the above prior art documents.

In FIG. 5, a roll-shaped label sheet Y obtained by provisionally attaching multiple adhesive labels L to the front surface of a sheet-shaped backing strip D at predetermined intervals and winding the backing strip D with the labels L is contained in a label printer P.

After the label sheet Y is drawn out, the underside of the backing strip D is abutted against a platen roller 10 serving as a first conveying unit, and the label sheet Y is nipped between the platen roller 10 and the surface of a thermal head H serving as a print unit. Then, the label sheet Y is conveyed in the direction of an arrow S1 (upward direction on the paper plane of FIG. 5).

Above the platen roller 10, a rod-shaped peeling pin 30 serving as a label peeling member that peels the labels L from the backing strip D is provided so as to extend in the widthwise direction of the label sheet Y. Then, the label sheet Y makes a U-turn around the peeling pin 30 and is conveyed in the direction of an arrow S2 (downward direction).

Obliquely below the peeling pin 30, a peeling roller 20 serving as a second conveying unit is provided so as to contact the peripheral surface of the platen roller 10 and to rotate by following rotation of the platen roller 10. Finally, the backing strip D, from which the labels L have been peeled, is nipped between the peeling roller 20 and the platen roller 10 and is discharged in the direction of an arrow S3.

Here, reference symbol F2 denotes a frame constituting a discharging opening 600, through which the conveyed backing strip D is discharged, and the like.

Next, there will be described a principle by which the labels L of the label sheet Y are peeled from the backing strip D by the peeling pin 30.

The peeling pin 30 is selected so as to have a diameter smaller than those of the platen roller 10 and the peeling roller 20, and the label sheet Y is pulled so as to make a sharp U-turn around the peeling pin 30 in the direction of an arrow S2 that is approximately opposite to the conveying direction S1. Here, a paper piece constituting each label L is thicker and stiffer than the backing strip D, so that when the conveying direction is changed and the label sheet Y makes the U-turn along the perimeter of the peeling pin 30, only the backing strip D is conveyed in the S2 direction and the labels L are peeled and separated from the surface of the backing strip D due to their own stiffness (see the broken line L').

That is, after the label sheet Y is conveyed by the platen roller 10 in the S1 direction and is subjected to predetermined printing by the thermal head H, the backing strip D is pulled in the S2 direction from the peeling pin 30 by the platen roller 10 and the peeling roller 20. As a result, the labels L are automatically peeled from the backing strip D.

By the way, in order to prevent the labels L from strongly adhering to the front surface of the backing strip D, the surface energy of the front surface of the backing strip D is lowered by, for instance, applying a resin thereto. Consequently, when the backing strip D is nipped between the platen roller 10 and the peeling roller 20 and is pulled in the S2 direction, a skid (freewheeling) may occur on the peripheral surface of the peeling roller 20 that slidably contact the front surface of the backing strip D.

When such a skid occurs, a difference is caused between the speed, at which the label sheet Y is conveyed in the S1 direction by the platen roller 10, and the speed at which the backing strip D is conveyed in the S2 direction by the platen roller 10 and the peeling roller 20. Consequently, slack in the printed label sheet Y occurs between the platen roller 10 and the peeling pin 30, which results in an inconvenient state where the label sheet Y floats up in the direction of an arrow B as shown in FIG. 5.

As a result of the slack in the label sheet Y, there occurs the state shown in FIG. 5 where the printed label sheet Y is spaced from the peripheral surface of the peeling pin 30 and there occurs a phenomenon where there is reduced the angle at which the label sheet Y makes a U-turn around the peeling pin 30 in the S2 direction. Consequently, there occurs a problem that the labels L are not peeled by the peripheral surface of the peeling pin 30 and are conveyed along with the backing strip D in the S2 direction.

In order to prevent such peeling failure of the labels L, it is required to eliminate the slack in the label sheet Y by manually pulling the end portion of the backing strip D in the S3 direction. Alternatively, a mechanism for driving the peeling roller 20 may be additionally provided, for instance. With this construction, the peeling roller 20 is rotated at all times in the direction of an arrow K1 shown in FIG. 5 and tension is applied to the label sheet Y. In this case, however, there occurs a problem that the construction becomes complicated and the manufacturing cost is increased.

SUMMARY OF THE INVENTION

The present invention has been made in order to solve the problems described above and is directed to a label peeling mechanism for a continuous label strip which is capable of preventing peeling failure from occurring by suppressing slack in a label sheet, and to a label printer apparatus using the label peeling mechanism.

According to an aspect of the present invention, there is provided a label peeling mechanism for a continuous label strip, by which a continuous label strip (label sheet Y) obtained by provisionally attaching multiple adhesive label pieces (labels L) to the front surface of a sheet-shaped backing strip (D) at predetermined intervals and winding the backing strip with the label pieces to a roll shape is conveyed and the label pieces are peeled and separated from the backing strip, the label peeling mechanism including: a first conveying unit (platen roller 10, for instance) that conveys the continuous label strip in a first direction (S1 direction) in which the label pieces are continuously arranged; a label peeling member (peeling pin 30, for instance) that is disposed along the first direction so as to be spaced from the first conveying unit by a predetermined distance, is abutted against the underside of the backing strip of the continuous label strip conveyed by the first conveying unit, and peels the label pieces from the backing strip; a second conveying unit (platen roller 10 and peeling roller 20, for instance) that pulls the sheet-shaped backing strip, from which the label pieces have been peeled, in a second direction (S2 direction) that is opposite to the first direction from the label peeling member; and a slack preventing member (40) disposed to oppose the front surface of the continuous label strip between the first conveying unit and the label peeling member and suppresses slack where the continuous label strip floats up to the front surface side.

With this construction, it becomes possible to suppress the occurrence of a phenomenon where the continuous label strip floats up to the front surface side between the first conveying unit and the label peeling member and to avoid a phenomenon where printed label pieces are spaced from the peripheral surface of the label peeling member and there is reduced an angle at which the continuous label strip makes a U-turn around the label peeling member. As a result, it becomes possible to prevent the occurrence of peeling failure where the label pieces are not peeled by the peripheral surface of the label peeling member and are conveyed along with the backing strip. Also, unlike the conventional case, it is not required to provide a tension mechanism for preventing the slack in the continuous label strip from occurring, which simplifies the construction and makes it possible to reduce the manufacturing cost.

Here, the first conveying unit may be constructed using a conveying roller including a drive unit, and the second conveying unit may be constructed using a peeling roller. This construction makes it possible to construct the first conveying unit and the second conveying unit with ease.

Also, the peeling roller may contact the conveying roller and rotate by following rotation of the conveying roller, and the sheet-shaped backing strip, from which the label pieces have been peeled, may be nipped between and conveyed by the conveying roller and the peeling roller. With this construction, it becomes unnecessary to additionally provide a source for driving the peeling roller, which simplifies the construction and makes it possible to reduce the manufacturing cost.

Further, the slack preventing member may be constructed using a plate-shaped body or a rod-shaped body having a length that is at least equal to the width of the continuous label strip. With this construction, it becomes possible to construct the slack preventing member with ease and to suppress the slack in the continuous label strip with reliability.

Also, the label peeling member may be constructed using any of a plate-shaped body, a rod-shaped body, and a rotatable roller each having a length that is at least equal to the width of the continuous label strip. With this construction, it becomes possible to construct the label peeling member with ease and to peel the label pieces from the backing strip with reliability.

Also, a discharging frame that discharges the conveyed sheet-shaped backing strip in a predetermined direction may be disposed in proximity to the second conveying unit, and the slack preventing member may be formed integrally with the discharging frame. With this construction, it becomes possible to reduce the number of construction elements and to reduce the manufacturing cost.

Also, a discharging opening that discharges the label pieces peeled from the sheet-shaped backing strip by the label peeling member in a predetermined direction may be formed integrally with the discharging frame in proximity to the label peeling member. With this construction, it becomes possible to further reduce the number of construction elements and to further reduce the manufacturing cost.

Also, the discharging frame may be provided so as to be rotatable along with at least the slack preventing member in a direction in which the discharging frame is spaced from the first conveying unit and the label peeling member. With this construction, it becomes possible to conduct maintenance work, such as the mounting of a continuous label strip, with efficiency.

Also, according to another aspect of the present invention, there is provided a label printer apparatus including: the aforementioned label peeling mechanism for a continuous label strip; and a print head that performs printing on the label pieces. With this construction, it becomes possible to construct a label printer apparatus that is capable of peeling each printed label piece from the backing strip with reliability.

Also, a printable surface made of a thermal coloring layer may be formed on the front surface of each label piece, and the first conveying unit may include: a platen roller that is disposed in proximity to the slack preventing member and is brought into slidable contact with the surface of the print head that performs thermal printing on the printable surface of the label piece; and a rotation drive unit that rotates the platen roller. With this construction, it becomes possible to perform the printing on the label pieces with a thermal scheme using a thermal head and to have the conveying unit double as the label peeling mechanism. As a result, it becomes possible to reduce the number of construction elements and to reduce the manufacturing cost.

BRIEF DESCRIPTION OF THE DRAWINGS

A preferred embodiment of the present invention will be described in detail based on the following drawings, in which.

DETAILED DESCRIPTION OF THE PREFERRED EMBODIMENTS

A preferred embodiment of the present invention will now be described with reference to the accompanying drawings.

Figure 1:
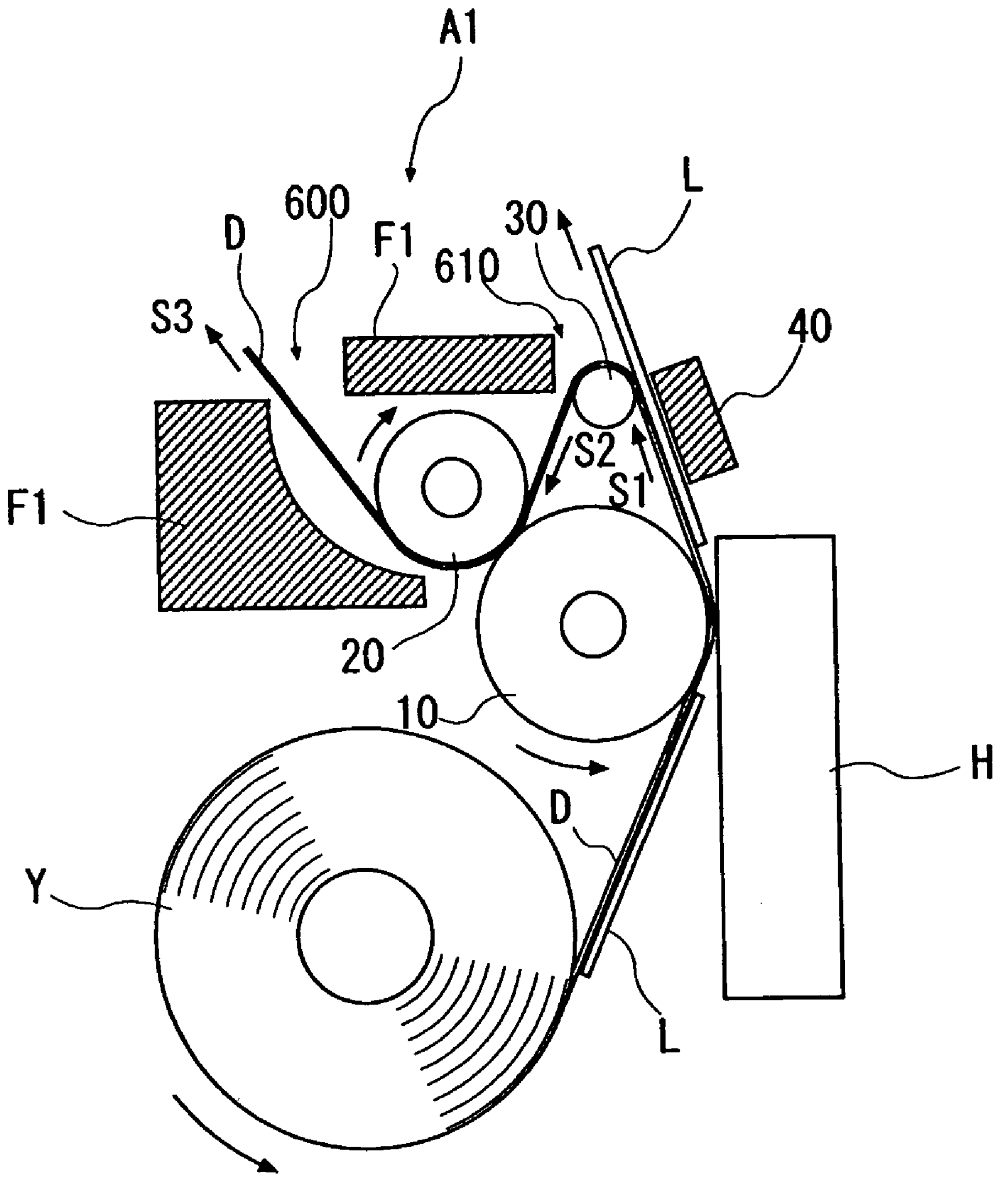
FIG. 1 is a schematic drawing showing a construction of a label printer apparatus according to the present invention.
Figure 2A:
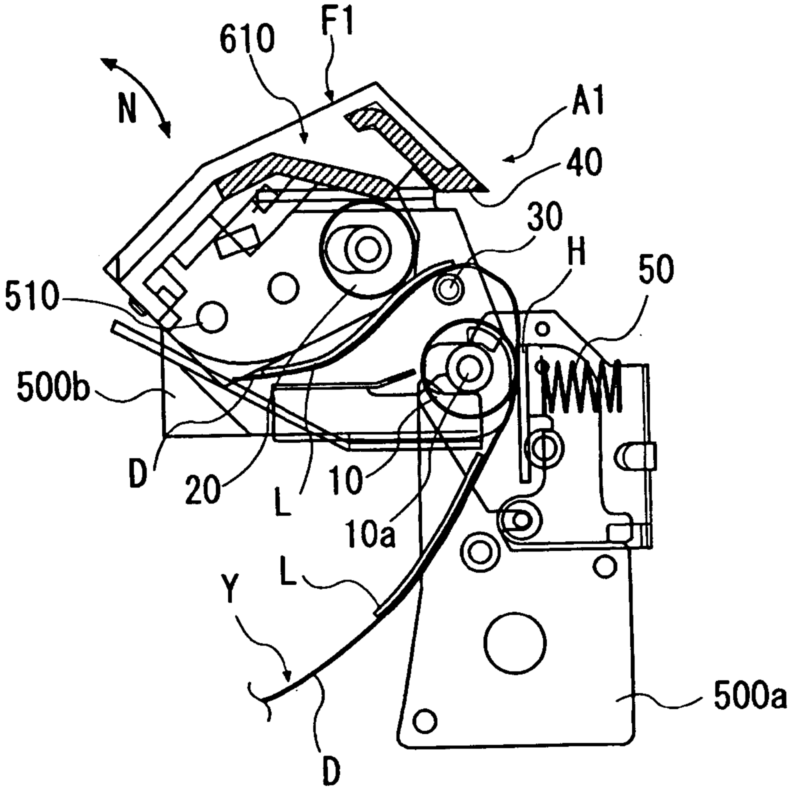
FIGS. 2A and 2B are each a side view showing a main part of an embodiment of the label printer apparatus according to the present invention.
Figure 2B:
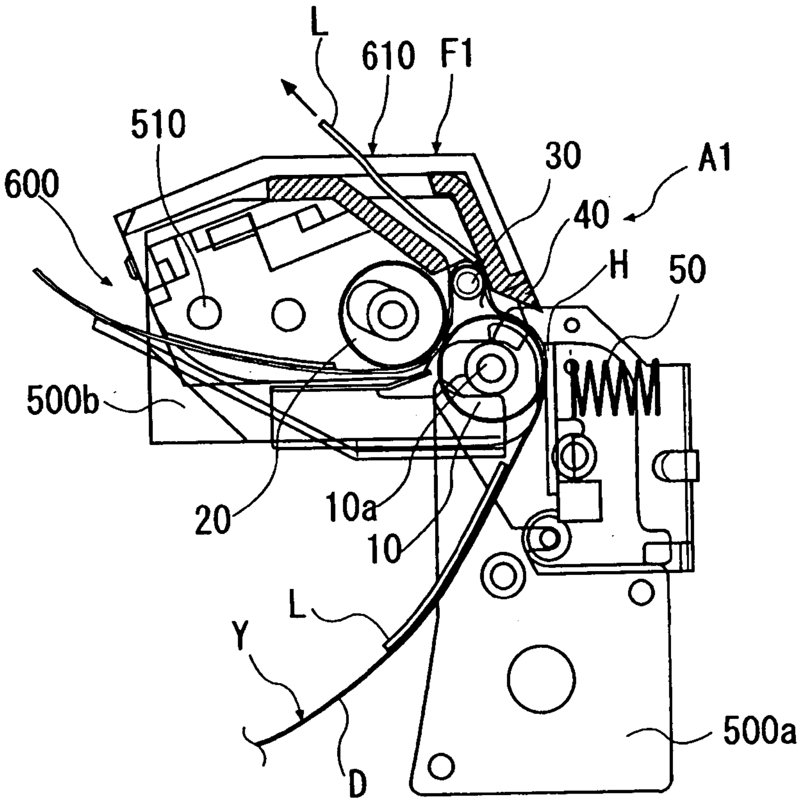
Figure 3A:
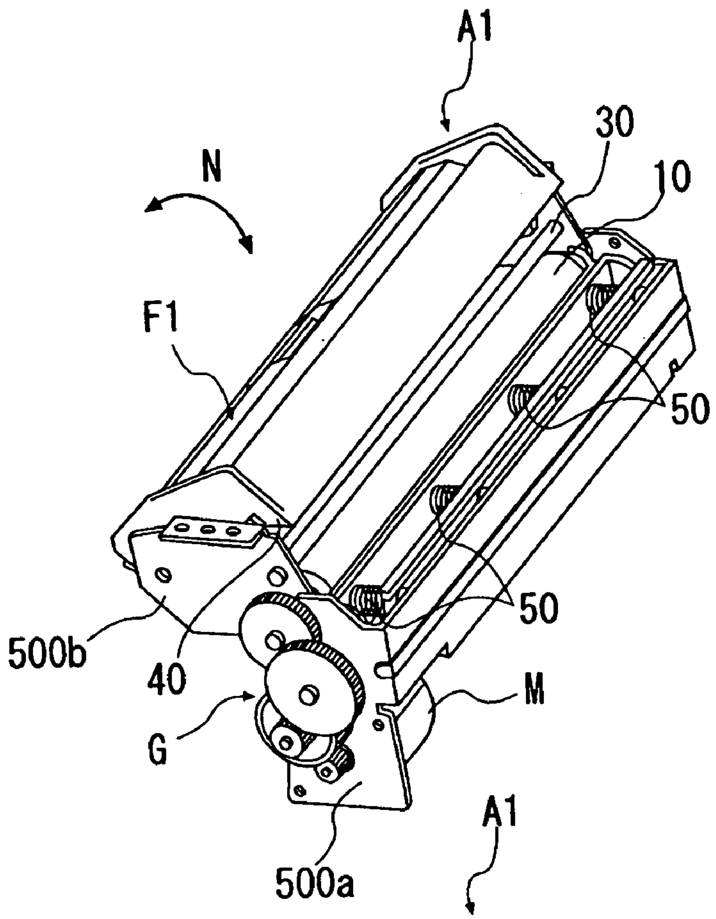
FIGS. 3A and 3B are each a perspective view showing the main part of the embodiment of the label printer apparatus according to the present invention.
Figure 3B:
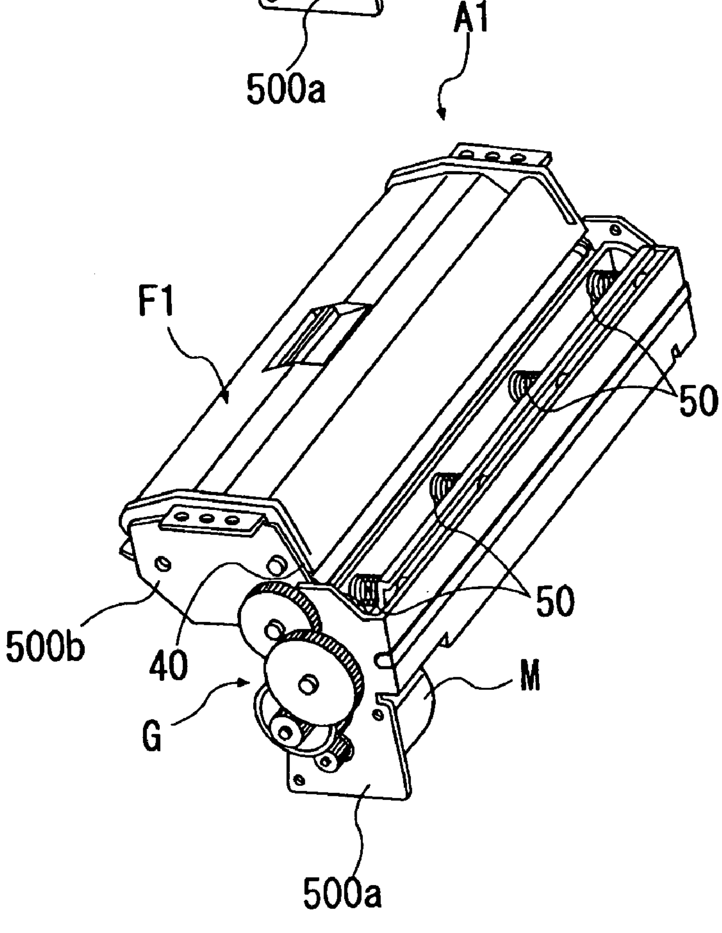
Figure 4A:
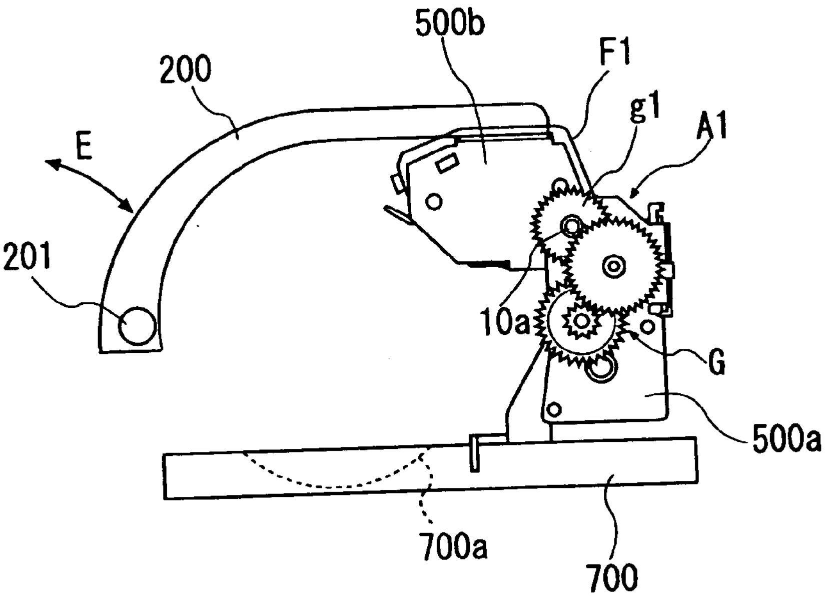
FIGS. 4A and 4B are each a side view showing the whole of the label printer apparatus according to the embodiment.
Figure 4B:
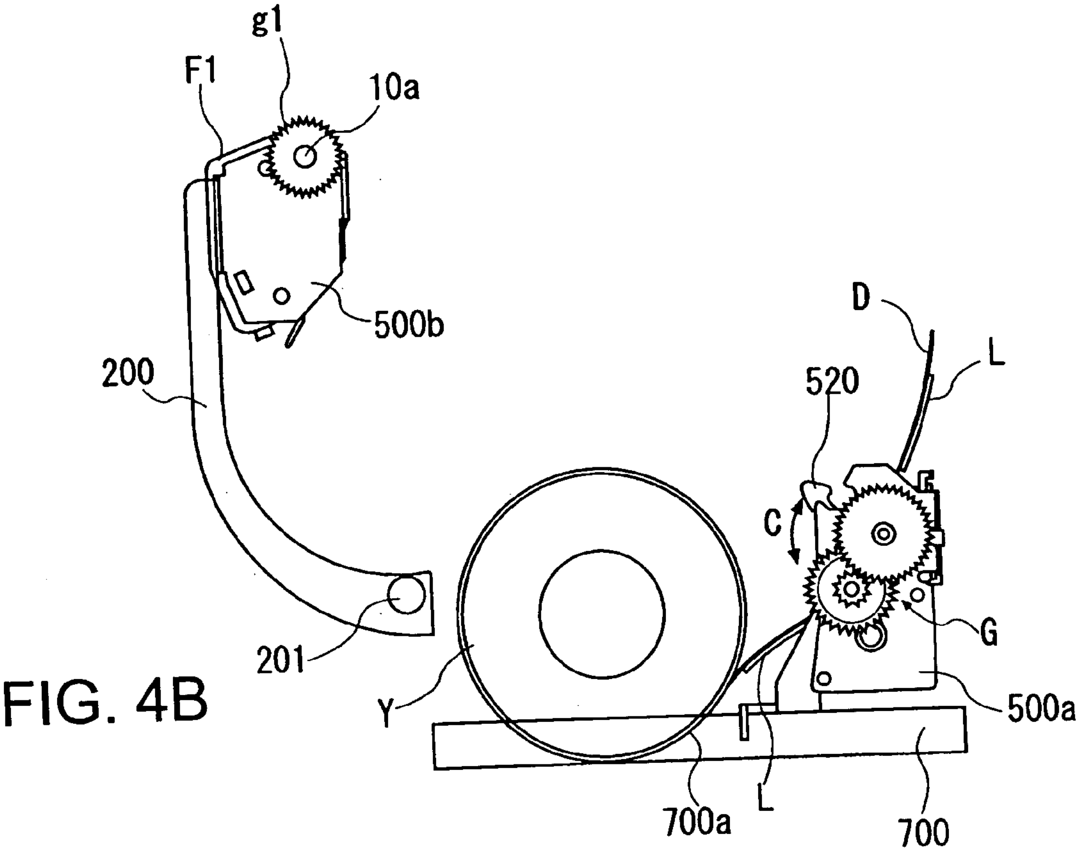
Figure 5:
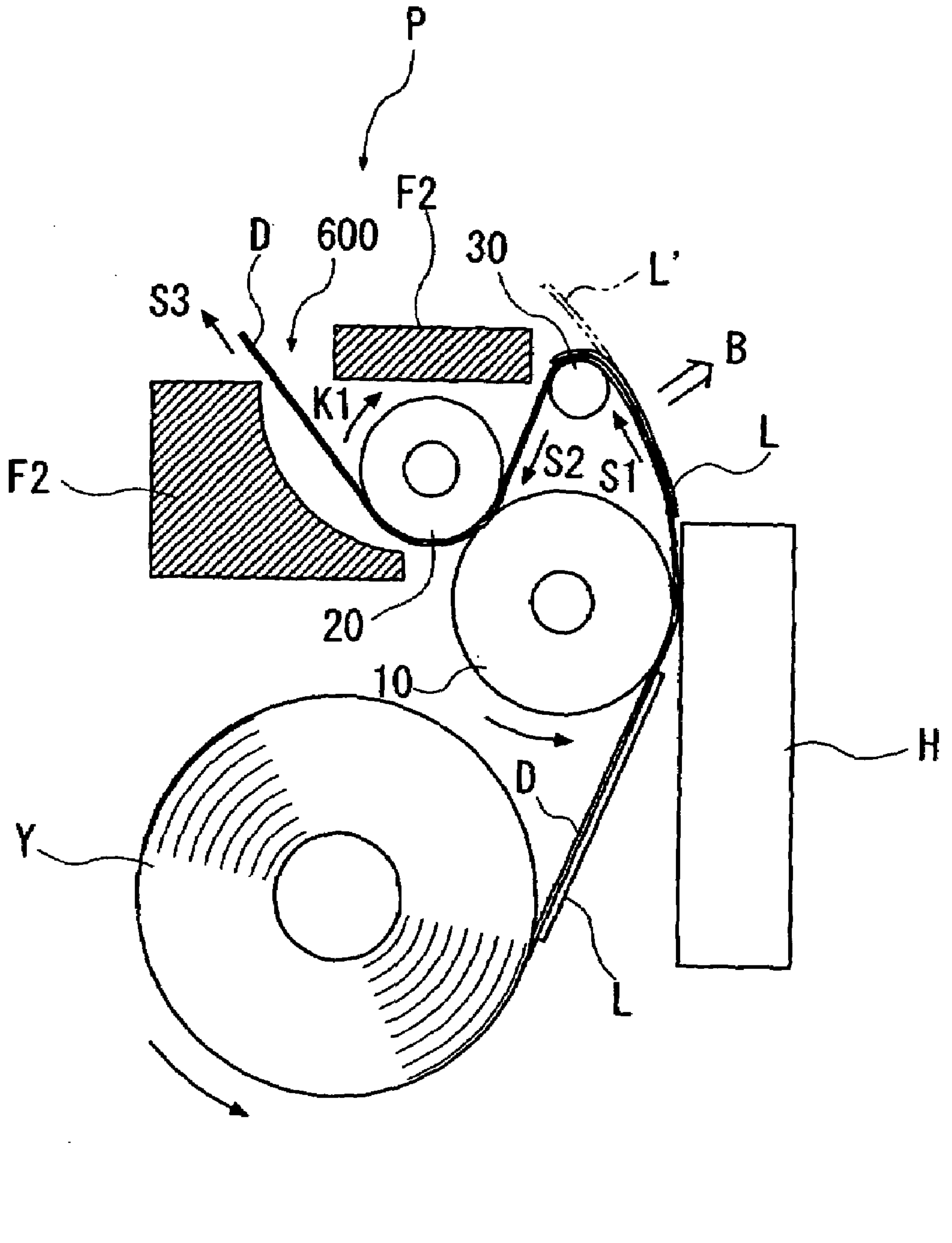
FIG. 5 PRIOR ART
FIG. 5 is a schematic drawing showing a construction of a conventional label printer apparatus.

FIG. 1 is a construction drawing showing an outline of a label printer apparatus according to the present invention, FIGS. 2A and 2B are each a side view showing the main part of the embodiment of the label printer apparatus, FIGS. 3A and 3B are each a perspective view thereof, and FIGS. 4A and 4B are each a side view showing the whole of the label printer apparatus according to the embodiment.

In FIG. 1, a roll-shaped label sheet Y obtained by provisionally attaching multiple adhesive backed labels L to the front surface of a sheetshaped backing member or strip D at predetermined intervals and coiling or winding the backing strip D with the labels L into a roll is contained in a label printer A1.

It should be noted here that a printable surface made of a thermal coloring layer is formed on the front surface of each label L and is subjected to predetermined thermal printing by a thermal head H serving as a print head to be described later, thereby printing characters, a barcode, or the like on the surface.

After the label sheet Y is drawn out of the roll, the underside of the backing strip D is abutted against a platen roller 10 serving as conveying means in the form of a first conveying unit, is nipped between the platen roller 10 and the surface of the thermal head H serving as a print unit, and is conveyed in the direction of an arrow S1 (upward direction on the paper plane of FIG. 1). Note that a drive gear train (see FIGS. 2A to 3B) engages with the platen roller 10 and is driven at predetermined timings by an electric motor M shown in FIGS. 3A and 3B.

Above the platen roller 10, a rod-shaped peeling pin 30 serving as a label peeling member that peels the labels L from the backing strip D is provided so as to extend in the widthwise direction of the label sheet Y. The label sheet Y makes a Uturn around the peeling pin 30 and is conveyed in the direction of an arrow S2 (downward direction). Note that the label peeling member is not limited to this peeling pin 30 and may be constructed using a flat-plate-shaped member or a rotatable roller. Also, so as to peel the labels L from the backing strip D with reliability, that is, so as to have the label sheet Y make a sharp Uturn from the S1 direction to the S2 direction, it is preferable that the label peeling member has a small diameter.

Obliquely below the peeling pin 30, a peeling roller 20 serving as a second conveying unit is provided so as to contact the peripheral surface of the platen roller 10 and to rotate by following rotation of the platen roller 10. The backing strip D, from which the labels L have been peeled by the action of the peeling pin 30, is nipped between the peeling roller 20 and the platen roller 10 and is discharged in the direction of an arrow S3.

Reference symbol F1 denotes a discharging frame constituting a discharging opening 600 through which the conveyed backing strip D is discharged, a discharging opening 610 through which the peeled labels L are discharged, and the like. Here, the discharging frame is a unitary frame structure made of a resin such as plastic.

Also, reference numeral 40 denotes slack preventing means in the form of a slack preventing member that is provided between the platen roller 10 and the peeling pin 30 so as to oppose the surfaces of the label L of the label sheet Y with a predetermined distance (around 0.5 mm, for instance) in-between. This slack preventing member 40 is constructed using a plate-shaped body or a rod-shaped body having a length that is the same as the width of the label sheet Y. In this embodiment, the slack preventing member 40 is formed integrally with the discharging frame F1 using a resin.

With this slack preventing member 40, it becomes possible to suppress the occurrence of a phenomenon where the labels L float up to the front surface side between the platen roller 10 and the peeling pin 30 and there occurs slack. It also becomes possible to prevent the occurrence of a phenomenon where printed labels L float up and are spaced from the peripheral surface of the peeling pin 30 and there is reduced an angle at which the label sheet Y makes a U-turn around the peeling pin 30 to the S2 direction. As a result, it becomes possible to effectively prevent the occurrence of peeling failure where the labels L are not peeled by the peripheral surface of the peeling pin 30 and are conveyed along with the backing strip D. Also, unlike the conventional case, it is not required to provide a tension mechanism for avoiding the slack in the label sheet Y, so that the construction of the printer apparatus is simplified and it becomes possible to reduce the manufacturing cost.

Next, the construction of an embodiment of the label printer A1 will be described in more detail with reference to FIGS. 2A, 2B, 3A, 3B, 4A, and 4B.

As shown in these drawings, respective members constituting the label printer A1 are separately attached to the discharging frame F1 and supporting frames 500*a* and 500*b*.

To the supporting frame 500*a*, there are attached the thermal head H to be brought into slidable contact with the peripheral surface of the platen roller 10, a spring 50 that energizes the thermal head H toward the platen roller 10 side, and a drive gear train G and an electric motor M for driving the platen roller 10. Also, as shown in FIG. 4B, a rock arm 520 that detachably supports a rotation axis 10*a* of the platen roller 10 is provided so as to be rockable in the direction of an arrow C.

Also, to the supporting frame 500*b*, there are attached the peeling pin 30 and the platen roller 10. Note that, as shown in FIGS. 4A and 4B, a driven gear g1 that engages with the drive gear train G is fastened to one end portion of the platen roller 10.

As described above, the supporting frame 500*a* and the supporting frame 500*b* are constructed so as to be coupled to and separated from each other through the engagement and disengagement between the rotation axis 10*a* of the platen roller 10 and the rock arm 520. The attachment and detachment will be concretely described later.

On the other hand, to the discharging frame F1, the peeling roller 20 is attached so as to freely rotate. Further, this discharging frame F1 itself is pivoted about a rotation axis 510 so as to be opened/closed in the direction of an arrow N (see FIG. 2A) with reference to the supporting frame 500*b*.

Also, a printer unit constructed of the discharging frame F1 and the supporting frames 500*a* and 500*b* is implemented in the manner shown in FIG. 4A, thereby constituting the label printer apparatus A1. That is, the supporting frame 500*a* is fastened on a base member 700 including a placement portion 700*a* on which the roll-shaped label sheet Y is placed. Also, the supporting frame 500*b* is fastened to an end portion of an arm member 200 that is pivoted about a rotation axis 201 and is opened/closed in the direction of an arrow E (see FIG. 4A).

Next, there will be described the use method and operation of the label printer apparatus A1 constructed in the manner described above.

First, as shown in FIG. 4A, the arm member 200 is lifted up and opened by a manual operation. At this time, the rotation axis 10*a* of the platen roller 10 on the supporting frame 500*b* side is disengaged from the rock arm 520 on the supporting frame 500*a* side, thereby obtaining an opened state shown in FIG. 4B.

Here, the roll-shaped label sheet Y is set on the placement portion 700*a* of the base member 700, and an end portion of the label sheet Y is drawn out to the supporting frame 500*a*. Next, the arm member 200 is closed by a manual operation, thereby obtaining a state where the rotation axis 10*a* of the platen roller 10 on the supporting frame 500*b* side engages with the rock arm 520 on the supporting frame 500*a* side.

As a result, there is obtained a state where the end portion of the label sheet Y is nipped between the thermal head H and the platen roller 10.

Next, as shown in FIGS. 2A and 3A, there is obtained a state where the discharging frame F1 is lifted up in the N direction by a manual operation. Then, as shown in FIG. 2A, the end portion of the label sheet Y is inserted so as to pass over the peeling pin 30. Note that this insertion may be conducted under a state where the first label L is provisionally attached to the backing strip D. As to be described later, the second and following labels L will be automatically peeled from the backing strip D.

Next, by a manual operation, the discharging frame F1 is rotated in the N direction again, thereby closing the discharging frame F1. As a result, there is obtained the state shown in FIG. 2B where the label sheet Y passes through between the thermal head H and the platen roller 10 and contacts the slack preventing member 40 formed integrally with the discharging frame F1 and the underside of the backing strip D is abutted against the peripheral surface of the peeling pin 30. After making a sharp U-turn, the label sheet Y is nipped between the platen roller 10 and the peeling roller 20 and is forwarded to the discharging opening 600 side. As described above, according to this embodiment, it is possible to complete the setup of the label shet Y mrely by closing the discharging frame F1, which makes it possible to improve the convenience.

Then, after the setup of the label sheet Y is completed, the label printer apparatus A1 is brought into operation. As a result, the electric motor M and the thermal head H are driven at predetermined timing under control by a not-shown control apparatus, the label sheet Y is conveyed by the platen roller 10, and thermal printing is performed on the front surface of each label L by the thermal head H.

Further, the end portion of the label sheet Y is pulled by the platen roller 10 and the peeling roller 20, the underside of the backing strip D is abutted against the peripheral surface of the peeling pin 30, and the printed label sheet Y makes a sharp U-turn. Here, paper pieces constituting the labels L are thicker and stiffer than the backing strip D, so that the second and following labels L are peeled from the backing strip D and are conveyed away from the pripheral surface of the peeling pin 30 because of their own stiffness and only the backing strip D is conveyed to the discharging opening 600 (see FIG. 2B).

Also, during this operation, by the action of the slack preventing member 40, there is suppressed the occurrence of a phenomenon which the label L float up to the front surface side between the platen roller 10 and the peeling pin 30. That is, there is prevented the occurrence of a phenomenon where printed labels L float up and are spaced from the peripheral surface of the peeling pin 30 and there is reduced an angle at which the labels L make a U-turn around the peeling pin 30. As a result, there is effectively prevented the occurrence of peeling failure where the labels L are not peeled by the peripheral surface of the peeling pin 30, and are conveyed along with the backing strip D. Also, unlike the convention case, it is not required to provide a tension mechanism for preventing the slack in the label sheet Y, which simplifies the construction of the printer apparatus and makes it possible to reduce the manufacturing cost.

Although the present invention made by the inventors of the present invention has been concretely described above based on the embodiment, the present invention is not limited to the above embodiment, and it is possible to make various changes and modifications without departing from a gist of the present invention.

For instance, in the embodiment described above, there has been described a case which the peeling pin 30 is used as the label peeling member. However, the present invention is not limited to this and the label peeling member may be constructed using a plate-shaped body or a rotatable roller.

Also, the shape of the slack preventing member 40 is not limited to the flat-plate shape described in the embodiment, and it is possible to obtain the same effects even if the slack preventing member 40 has a pin shape or the like. Also, in the embodiment, there has been described a case where the slack preventing member 40 is formed integrally with the discharging frame F1. However, the present invention is not limited to this and the slack preventing member may be provided as a separated member.

Further, in the embodiment, there has been described a case where the peeling roller 20 is constructed so as to contact the platen roller 10 and to rotate by following rotation of the platen roller 10. However, the present invention is not limited to this, and a unit for driving the peeling roller 20 may be additionally provided.

Also, in the embodiment, there has been described a case where a thermal scheme is adopted to perform printing on the labels L, but the present invention is not limited to this, and it is possible to use an ink jet scheme, a laser print scheme, or the like, in place of the thermal scheme. In this case, the surface of each label L is subjected to surface processing suited for the employed print scheme, in place of the application of the thermal print layer.

As described above, according to the present invention, there is provided the label peeling mechanism for the continuous label strip, by which the continuous label strip obtained by provisionally attaching multiple adhesive label pieces to the front surface of the sheet-shaped backing strip at predetermined intervals and winding the backing strip with the label pieces to the roll shape is conveyed and the label pieces are peeled and separated from the backing strip, the label peeling mechanism including: the first conveying unit that conveys the continuous label strip in the first direction in which the label pieces are continuously arranged; the label peeling member that is disposed along the first direction so as to be spaced from the first conveying unit by the predetermined distance, is abutted against the underside of the backing strip of the continuous label strip conveyed by the first conveying unit, and peels the label pieces from the backing strip; the second conveying unit that pulls the sheet-shaped backing strip, from which the label pieces have been peeled, in the second direction that is opposite to the first direction from the label peeling member; and the slack preventing member disposed to oppose the front surface of the continuous label strip between the first conveying unit and the label peeling member and suppresses slack where the continuous label strip floats up to the front surface side. With this construction, there are achieved effects that it is possible to suppress the occurrence of the phenomenon in which the continuous label strip floats up to the front surface side between the first conveying unit and the label peeling member and slack occurs in the continuous label strip, it is possible to prevent the phenomenon in which printed label pieces are spaced from the peripheral surface of the label peeling member and there is increased the angle at which the label sheet makes the U-turn around the label peeling member, and it is possible to prevent the occurrence of peeling failure where the label pieces are not peeled by the peripheral surface of the label peeling member and are conveyed along with the backing strip.

Also, unlike the conventional case, it is not required to provide the tension mechanism for preventing the slack in the continuous label strip from occurring, which simplifies the construction and makes it possible to reduce the manufacturing cost.

What is claimed is:

1. A label peeling mechanism for peeling labels having a non-adhesive surface and an adhesive surface removably adhered at preselected intervals to a front surface of a backing member of a continuous label strip which is coiled into a roll, the label peeling mechanism comprising:

- a first support frame;
- a second support frame detachably connected to the first support frame;
- a discharge frame pivotally mounted to the second support frame for undergoing pivotal movement between opened and closed positions thereof, the discharge frame having a first discharge opening and a second discharge opening;
- a first conveying unit mounted on the second support frame for conveying the continuous label strip in a first direction;
- a label peeling member for contacting a rear surface of the backing member when the continuous label strip is conveyed by the first conveying unit to thereby peel the labels from the front surface of the backing member and convey the peeled labels towards the first discharge opening of the discharge frame;
- a second conveying unit for pulling the backing member from which the labels have been peeled in a second direction different from the first direction and for conveying the pulled backing member toward the second discharge opening of the discharge frame; and
- a slack preventing member integral with the discharge frame for suppressing slack of the continuous label strip when the discharge frame is in the closed position, the slack preventing member being disposed opposite to and confronting the non-adhering surface of each of the labels disposed between the first conveying unit and the label peeling member during conveyance of the continuous label strip by the first conveying unit in the first direction.

2. A label peeling mechanism according to claim 1; wherein the first conveying unit comprises a conveying roller and a drive unit for rotationally driving the conveying roller; and wherein the second conveying unit comprises a peeling roller.

3. A label peeling mechanism according to claim 2; wherein the peeling roller is rotationally driven by the conveying roller; and wherein the backing member from which the labels have been peeled is pulled by the peeling roller to a position between the peeling roller and the conveying roller so that the backing member from which the labels have been peeled is conveyed by the peeling roller and the conveying roller toward the second discharge opening of the discharge frame.

4. A label peeling mechanism according to claim 1; wherein the slack preventing member comprises a plate-shaped body having a length that is at least equal to a width of the continuous label strip.

5. A label peeling mechanism according to claim 1; wherein the label peeling member comprises a plate-shaped body having a length that is at least equal to a width of the continuous label strip.

6. A label peeling mechanism according to claim 1; wherein the second discharge opening of the discharge frame is disposed proximate the second conveying unit.

7. A label peeling mechanism according to claim 1; wherein the first discharge opening of the discharge frame is disposed proximate the label peeling member.

8. A label peeling mechanism according to claim 1; wherein the discharge frame is mounted for undergoing pivotal movement together with the slack preventing member to a position spaced from the first conveying unit and the label peeling member.

9. A label peeling mechanism according to claim 1; wherein the label peeling member is spaced-apart a preselected distance from the first conveying unit in the first direction.

10. A label peeling mechanism according to claim 1; wherein the slack preventing member comprises a rod-shaped body having a length that is at least equal to a width of the continuous label strip.

11. A label peeling mechanism according to claim 1; wherein the label peeling member comprises a rod-shaped body having a length that is at least equal to a width of the continuous label strip.

12. A label peeling mechanism according to claim 1; wherein the label peeling member comprises a roller mounted for undergoing rotation, the roller having a length that is at least equal to a width of the continuous label strip.

13. A label printer apparatus comprising: a label peeling mechanism according to claim 1; and a print head supported by the first support frame of the label peeling mechanism for printing on the non-adhesive surfaces of the labels.

14. A label printer apparatus according to claim 13; wherein the non-adhesive surface of each of the labels comprises a printable surface made of a thermal coloring layer.

15. A label printer apparatus according to claim 14; wherein the first conveying unit comprises a platen roller disposed proximate the slack preventing member for contacting a surface of the print head that performs thermal printing on the printable surfaces of the labels, and a rotation drive unit for rotationally driving the platen roller.

16. A label peeling mechanism according to claim 1; wherein the discharge frame is mounted on the second support frame so that the discharge frame and the second support frame are detachable as a unit from the first support frame.

17. A label peeling mechanism according to claim 1; further comprising a platen roller mounted on the second support frame and an engagement member mounted on the first support frame for engagement with the platen roller when the first support frame is connected to the second support frame and for disengagement from the platen roller when the first support frame is detached from the second support frame.

18. A label peeling mechanism according to claim 1; further comprising connecting means for detachably connecting the second support frame to the first support frame.

19. A label peeling mechanism according to claim 18; wherein the connecting means comprises a platen roller mounted on the second support frame and an engagement member mounted on the first support frame for engagement with and disengagement from the platen roller.

20. A label peeling mechanism comprising:

a first support frame;

a second support frame detachably connected to the first support frame;

peeling means mounted on the second support frame for peeling adhesive backed labels from a backing member of a continuous label strip;

conveying means mounted on the second support frame for conveying the continuous label strip to the peeling means;

a discharge frame pivotally mounted to the second support frame for undergoing pivotal movement between opened and closed positions thereof, the discharge frame having a discharge opening for discharging the adhesive backed labels peeled by the peeling means from the backing member of the continuous label strip; and slack preventing means integral with the discharge frame for suppressing slack of the continuous label strip when the discharge frame is in the closed position and as the adhesive backed labels are peeled by the peeling means from the backing member of the continuous label strip.

21. A label peeling mechanism according to claim 20; wherein the slack preventing means is disposed opposite to and confronts a surface portion of each of the adhesive backed labels disposed between the conveying means and the peeling means as the continuous label strip is conveyed to the peeling means.

22. A label peeling mechanism according to claim 20; wherein the discharge frame comprises a unitary frame structure and the peeling means comprises a portion of the unitary frame structure.

23. A label peeling mechanism according to claim 22; wherein the portion of the unitary frame structure corresponding to the peeling means and at least another portion of the unitary frame structure form the discharge opening.

24. A label printer apparatus comprising: a label peeling mechanism according to claim 20; and a print head mounted on the first support frame of the label peeling mechanism for printing on a surface of each of the adhesive backed labels.

25. A label printer apparatus according to claim 24; wherein the print head is disposed at a position relative to the peeling means so that the print head prints on the surface of each of the adhesive backed labels before the adhesive backed labels are peeled from the backing member of the continuous label strip by the peeling means.

26. A label peeling mechanism according to claim 20; wherein the discharge frame is mounted on the second support frame so that the discharge frame and the second support frame are detachable as a unit from the first support frame.

27. A label peeling mechanism according to claim 20; further comprising connecting means for detachably connecting the second support frame to the first support frame.

28. A label peeling mechanism according to claim 27; wherein the connecting means comprises a platen roller mounted on the second support frame and an engagement member mounted on the first support frame for engagement with and disengagement from the platen roller.

* * * * *